UNITED STATES PATENT OFFICE.

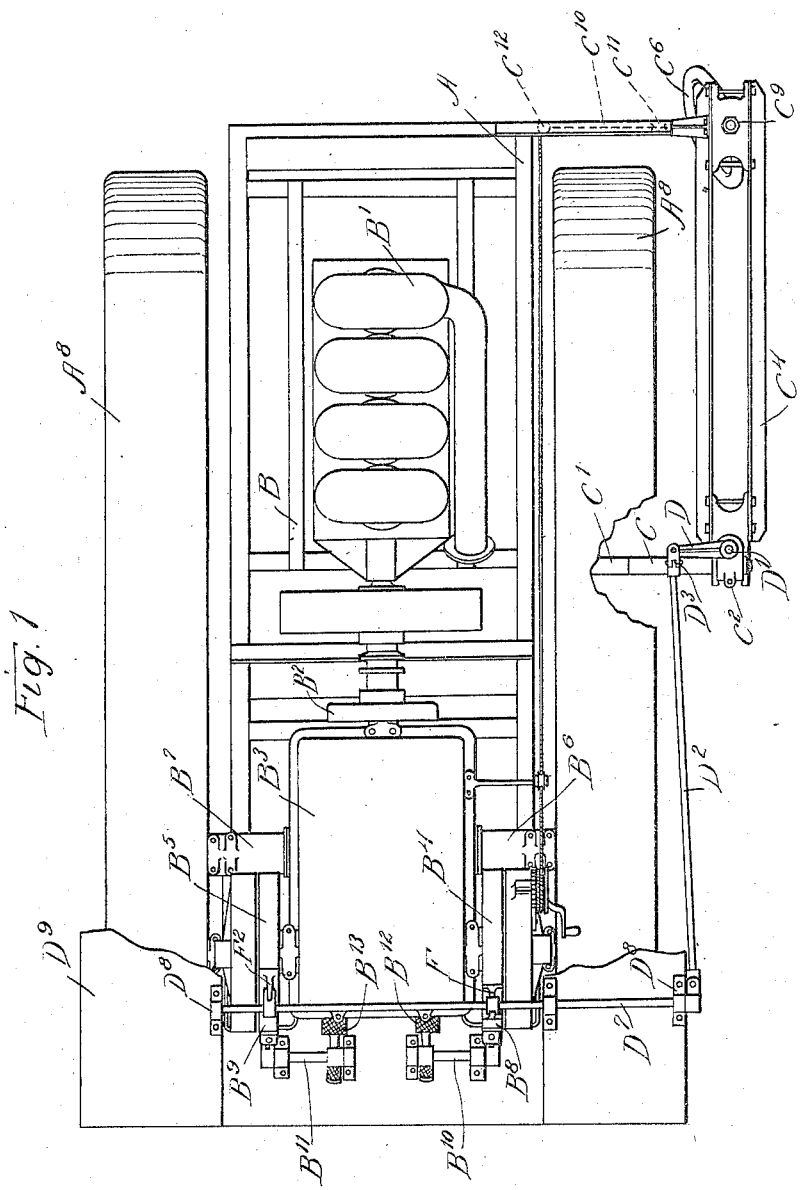

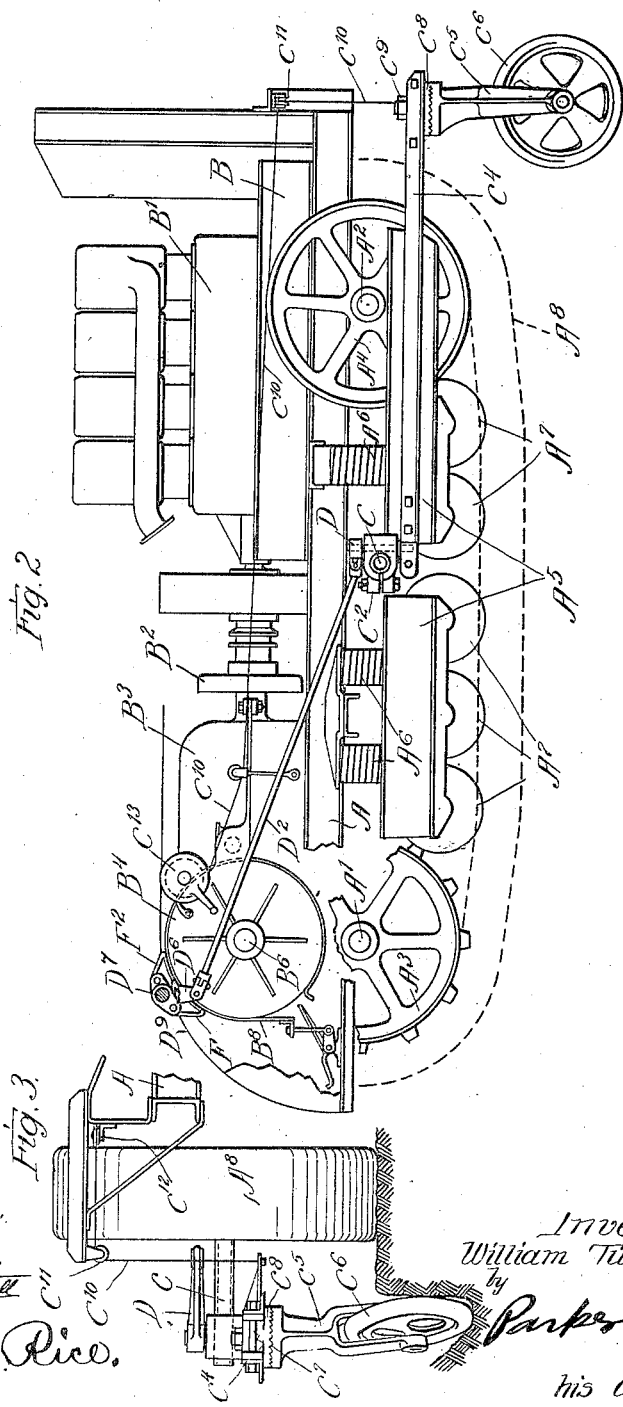

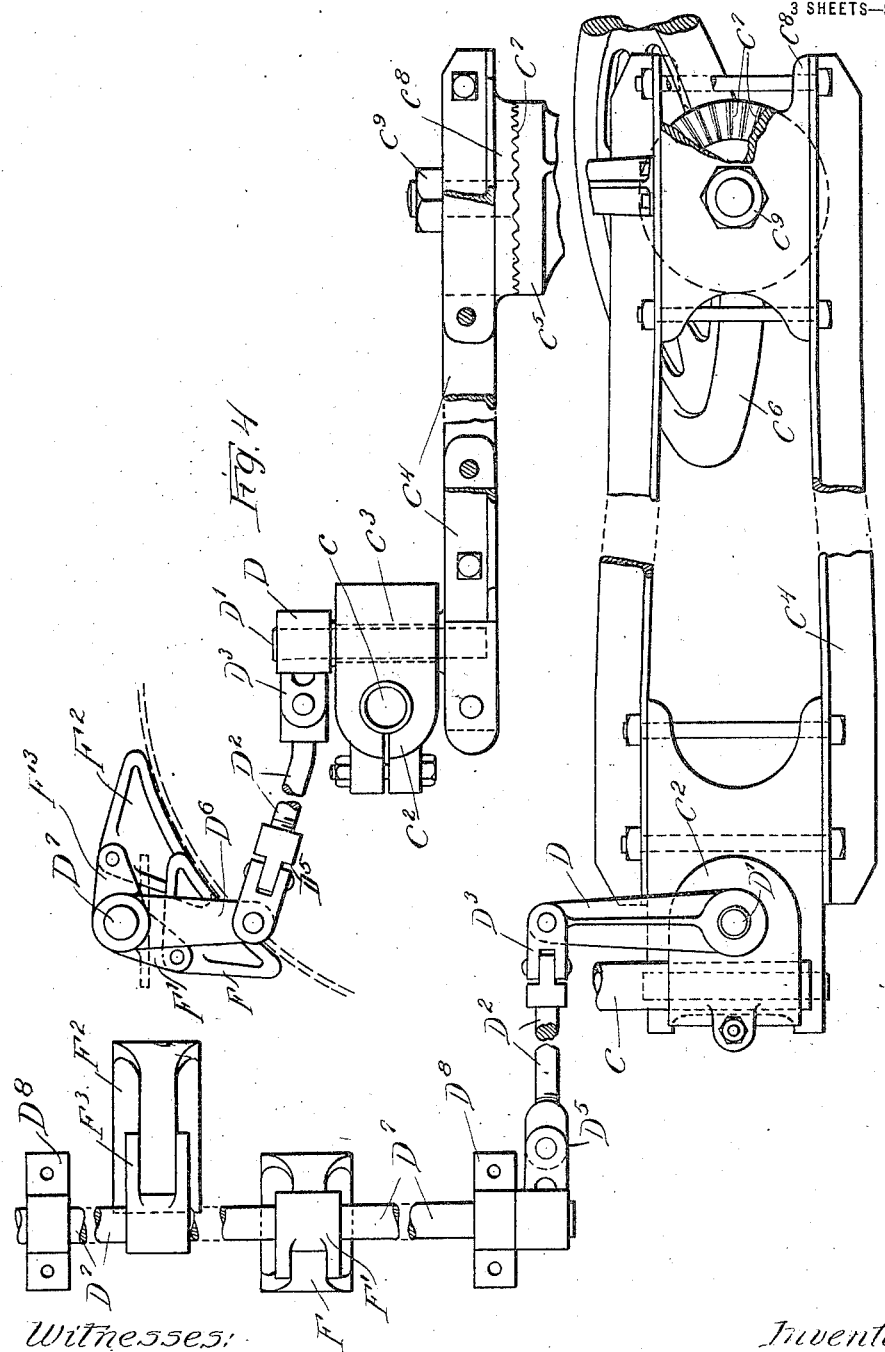

WILLIAM TURNBULL, OF STOCKTON, CALIFORNIA, ASSIGNOR TO HOLT MANUFACTURING COMPANY, OF PEORIA, ILLINOIS, A CORPORATION OF CALIFORNIA.

AUTOMATIC STEERING-GEAR FOR TRACTORS AND THE LIKE.

1,228,377.   Specification of Letters Patent.   Patented May 29, 1917.

Application filed September 30, 1914, Serial No. 864,258. Renewed March 27, 1917. Serial No. 157,845.

*To all whom it may concern:*

Be it known that I, WILLIAM TURNBULL, a citizen of the United States, residing at Stockton, San Joaquin county, California, have invented a certain new and useful Improvement in Automatic Steering-Gears for Tractors and the like, of which the following is a specification.

My invention is related generally to improvements for automatic means for steering tractors, vehicles and the like for use in plowing and other agricultural pursuits. It is illustrated diagrammatically in one form in the accompanying drawings, wherein Figure 1 shows a plan view;

Fig. 2 is a side elevation;

Fig. 3 is a detailed end elevation of a part of the steering mechanism;

Fig. 4 is an enlarged side view of the steering mechanism; and

Fig. 5 is an enlarged plan of the same.

Like parts are indicated by like letters throughout the several figures.

I have illustrated my invention as applied to the well-known type of caterpillar tractor, but this is merely for the sake of convenience as it is quite obvious that the invention might equally be applied to other devices.

A is a tractor main frame carrying at either end the shafts or axles $A'$, $A^2$. On the axle $A'$ is mounted the sprocket $A^3$ and on the axle $A^2$ is mounted the idler sprocket $A^4$. The main frame A is supported by a two-part truck $A^5$ through the medium of springs, or other suitable resilient supporting means $A^6$ interposel between the main frame, and the two-part truck, as shown more clearly in Fig. 1. This truck is, itself, supported on the rollers $A^7$ which travel on the chain or track $A^8$.

B is an over-frame or engine base frame upon which is mounted the engine $B^1$ driving through the clutch $B^2$ and transmission mechanism $B^3$. The transmission mechanism, clutch control and the like are more specifically claimed in my co-pending application No. 818,837, filed February 16, 1914 for tractor and do not need here any extensive discussion, suffice it to state that a manipulation of the two clutch members $B^4$, $B^5$ controls the operation of the two separate driving shafts $B^6$, $B^7$ whereby the two driving sprockets $A^3$, $A^3$ may be independently operated. $B^8$, $B^9$ are controlling brake bands for the combined brake clutch drums and are adapted to be manipulated by the operator through the medium of the rock shafts $B^{10}$, $B^{11}$ and pedals $B^{12}$, $B^{13}$.

C is an extension projecting outwardly from the pivot shaft $C^1$ of the two-part caterpillar truck. Upon it is rotatably but securely mounted a carriage $C^2$. This carriage has pivotally mounted thereon by means of a universal joint arrangement, as shown at $C^3$, a steering arm $C^4$ which arm projects forwardly to a point slightly in advance of the tractor frame. Downwardly depending from this arm is a vertical arm $C^5$ carrying the inclined furrow-hugging steering wheel $C^6$. The upper end of vertical arm $C^5$ is provided with serrations $C^7$ (see Fig. 5) which are adapted to engage the serrations in the supporting head $C^8$. This provides an arrangement whereby the angularity of the steering wheel $C^6$ may be adjusted. The two members $C^5$ $C^8$ are clamped in fixed position by means of a nut $C^9$. $C^{10}$ is a hoisting cable attached to the forward end of the steering arm passing over the pulleys $C^{11}$ and $C^{12}$ to the controlling windlass $C^{13}$ adjacent to the seat of the operator.

D is a rocker arm rigidly mounted on a pin $D^1$ which pin is attached to the steering arm $C^4$ for rotation therefor in a vertical plane. $D^2$ is a tie rod or link connected at its lower end to the rocker arm D by means of the universal joint member $D^3$ (as shown in Fig. 4) and at its upper end to the lever $D^6$ by means of a universal joint member $D^5$ (as shown in Figs. 4 and 5). The lever $D^6$ is secured to a rock shaft $D^7$ journaled in bearings $D^8$ on the guards $D^9$ on the main frame.

F is an auxiliary band controlling member actuated by the lever $F^1$ on the rock shaft $D^7$ and arranged for operation to throw out the clutch $B^4$ and arrest the movement of the right-hand caterpillar when the line of movement of the caterpillar diverges from the furrow causing the movement of the furrow wheel away from the front end of the tractor to rotate the rock shaft $D^7$ in a counterclockwise direction. $F^2$ is an auxiliary clutch control member actuated by the lever $F^3$ on the rock shaft $D^7$ when the line of movement of the caterpillar converges toward the furrow line bringing the furrow wheel toward the front end of the caterpillar to rock the shaft D⁷ in a clockwise direction.

Traction engines, particularly caterpillar traction engines such as the one illustrated in my drawings and described herewith are frequently, if not invariably, used for plowing. When once the furrow has been completed, it is desirable that each successive furrow shall be in absolute parallelism with the preceding and if automatic means can be provided which will guide the tractor in a parallel course the services of a steersman may be rendered unnecessary or else the time of a steersman or engineer may be left free for other activities. Where efforts have been made in the past to solve the problem it has frequently resulted in the production of a long steering arm projecting in front of the machine. This long arm necessitates turning through very large radii and moreover necessitates starting long before the boundary of the field has been reached. Also there being no convenient point from which the steering arm can be lifted great strains are put on all of the mechanism when it is desired to raise the steering arm and permit the tractor to move without being guided thereby. In my invention I have provided therefore a short, stout, rigid and convenient steering arm which projects little, if any, in front of the tractor and may be supported entirely therefrom, if need be, and adds very little to the space of the tractor in which to manipulate it.

It will be evident that while I have shown in my drawings an operative device, still many changes might be made both in size, shape and arrangement of parts without departing from the spirit of my invention, and I wish, therefore, that my drawings be regarded as in a sense diagrammatic.

The use and operation of my invention are as follows:—

When the tractor is going ahead in a straight line both clutches are in operation and each traction member is driven at the same rate of speed. If now slippage of the two tractor members is the same the engine will continue to progress forward in a right-line direction. The inclined furrow wheel will guide along the point of the furrow and nothing will happen. However, if the traction engine deviates from a path parallel with the furrow either to the right hand or to the left the steering arm will by virtue of its guiding wheel which limits it to the furrow be inclined to the right or to the left with respect to the tractor. If the steering arm is inclined away from the tractor the lever carried thereby will be drawn forward, the tie rod or link will be drawn forward and the rock shaft will be rotated in a clockwise direction thus throwing out the clutch on the right-hand side of the machine slowing up the caterpillar on that side allowing the caterpillar on the other side to do all of the work and thus resulting in turning the machine to the right until the path traveled thereby is again parallel with the furrow. If, however, the machine turns to the right the tractors on the left hand side of the frame will be thrown out and the drive will be through the tractor on the right hand side, so as to turn the vehicle away from the furrow and automatically cause it to resume its normal course. If the windlass is operated to lift the wheel out of the furrow, steering in the usual manner may be effected by means of the foot pedals.

It will be noted that the operation of the brake is such that the clutch is finally disengaged. If disengaging means continue to be operative the movement of the tractor member will be by the brake clutch band arrested and therefore the clutch acts first as a clutch and later as a brake.

I claim:

1. In a traction engine such as described, the combination of a main frame, a single power source, a single tractor on each side of the main frame, and means responsive to a deviation of the tractor engine to either side of a straight ahead line of travel for disconnecting from the power source the tractor on the side of the frame opposite to the line of deviation.

2. In a traction engine such as described, the combination of a main frame, a single power source, a single tractor on each side of the main frame, independent power connections between the power source and the respective tractors, a furrow wheel, and connections between the furrow wheel and the power connections of both tractors operative upon a deviation of the traction engine to either side of a straight ahead line of travel to disconnect from the power source the tractor on the side of the frame opposite to the line of deviation.

3. In a traction engine such as described, the combination of a main frame, a single power source, a single tractor on each side of the main frame, independent clutches between the power source and the respective tractors, a furrow wheel, and connections between the furrow wheel and the clutches operative upon a deviation of the traction engine to either side of a straight ahead line of travel to disconnect from the power source the tractor on the side of the frame opposite to the line of deviation.

4. In a traction engine such as described, the combination of a main frame, a single power source, a single tractor on each side of the main frame, independent clutches between the power source and the respective tractors, manually-controlled mechanism for operating said clutches to steer the traction engine, a furrow wheel, and connections between the furrow wheel and the clutches operative upon a deviation of the traction engine to either side of a straight ahead line of travel to disconnect from the power source the tractor on the side of the frame opposite to the line of deviation.

5. In a traction engine such as described, the combination of a main frame, a single power source, a single tractor on each side of the main frame, independent power connections between the power source and the respective tractors, a furrow wheel, connections between the furrow wheel and the power connections of both tractors operative upon a deviation of the traction engine to either side of a straight ahead line of travel to disconnect from the power source the tractor on the side of the frame opposite to the line of deviation, and means for manually elevating and lowering said furrow wheel into and out of the furrow.

6. In a traction engine such as described, the combination of a main frame, a single power source, a single tractor on each side of the main frame, independent clutches between the power source and the respective tractors, manually-controlled mechanism for operating said clutches to steer the traction engine, a furrow wheel, connections between the furrow wheel and the clutches operative upon a deviation of the traction engine to either side of a straight ahead line of travel to disconnect from the power source the tractor on the side of the frame opposite to the line of deviation, and means for manually elevating and lowering said furrow wheel into and out of the furrow.

In testimony whereof, I affix my signature in the presence of two witnesses this 21st day of September, 1914.

WILLIAM TURNBULL.

Witnesses:
ROBERT W. GOTSHALL,
EMIL F. NORELIUS.

Copies of this patent may be obtained for five cents each, by addressing the "Commissioner of Patents, Washington, D. C."